United States Patent [19]
Hongu

[11] Patent Number: 5,867,600
[45] Date of Patent: Feb. 2, 1999

[54] IMAGE CODING METHOD AND SYSTEM FOR PROVIDING REDUCED BIT RATE ARITHMETIC CODES

[75] Inventor: Takahiro Hongu, Tokyo, Japan

[73] Assignee: NEC Corporation, Tokyo, Japan

[21] Appl. No.: 748,490

[22] Filed: Nov. 8, 1996

[30] Foreign Application Priority Data

Nov. 8, 1995 [JP] Japan .................................. 7-289553

[51] Int. Cl.$^6$ .................................................. G06K 9/36
[52] U.S. Cl. ...................................... 382/247; 358/430
[58] Field of Search ................................... 382/176, 228, 382/238, 209, 245, 247, 236; 358/430, 261.2

[56] References Cited

U.S. PATENT DOCUMENTS

| | | | |
|---|---|---|---|
| 4,411,015 | 10/1983 | Scherl et al. ................................ | 382/176 |
| 4,504,972 | 3/1985 | Scherl et al. ................................ | 382/176 |
| 4,577,235 | 3/1986 | Kannapell et al. .......................... | 382/176 |
| 4,741,046 | 4/1988 | Matsunawa et al. ........................ | 382/176 |
| 5,018,024 | 5/1991 | Tanioka ........................................ | 382/176 |
| 5,091,782 | 2/1992 | Krause et al. ............................... | 382/236 |
| 5,297,220 | 3/1994 | Nomizu ........................................ | 382/247 |
| 5,577,132 | 11/1996 | Yokose et al. .............................. | 382/247 |

FOREIGN PATENT DOCUMENTS

| | | | |
|---|---|---|---|
| 0491556 | 6/1992 | European Pat. Off. | H04N 1/41 |
| 0613290 | 8/1994 | European Pat. Off. | H04N 1/41 |
| 5-183759 | 7/1993 | Japan | H04N 1/41 |

OTHER PUBLICATIONS

Patent Abstracts of Japan, European Patent Office, vol. 095, No. 002, Mar. 31, 1995.
Patent Abstracts of Japan, European Patent Office, vol. 018, No. 270, May 23, 1994.
Glen G, Langdon, Jr. "An Adaptive File Compression Algorithm", IBM Sa Jose Research Lab., San Jose, CA, RJ3460(41066), Apr. 23, 1982, Computer Science.
JBIG (Joint Bi–Level Image Coding Expert Group) T. 82.

*Primary Examiner*—Amelia Au
*Assistant Examiner*—Samir Ahmed

[57] ABSTRACT

A bi-level image coder for providing reduced bit rate arithmetic codes is disclosed, wherein each page of image to be coded is divided into a plurality of areas such as line groups, or blocks, and an arithmetic coder codes each of input pixels (the pixel $S_i$) by using a predicted value of MPS (most probable symbol) and a predicted probability of LPS (least probable symbol) occurrence which are generated with a template and a LPS predicted probability table. The pixel attribute of the pixel $S_i$ is determined to one of a character image attribute, a dither/dot image attribute and a halftoned image attribute based on statistical properties of the area of the pixel $S_i$. One of predetermined LPS predicted probability tables and one of predetermined templates are selected for each of the areas in operation. The coder may be so arranged as to following the JBIG standard. In one embodiment, a specific pixel of the template used for context data generation is moved to a position highly correlated with the pixel to be coded.

18 Claims, 9 Drawing Sheets

FIG. 2
PRIOR ART
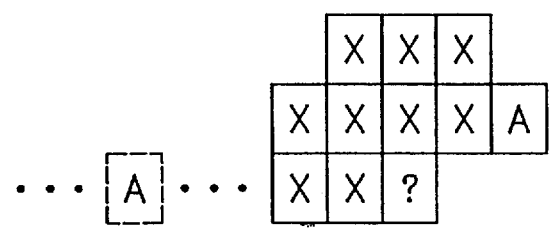
3 LINE TEMPLATE
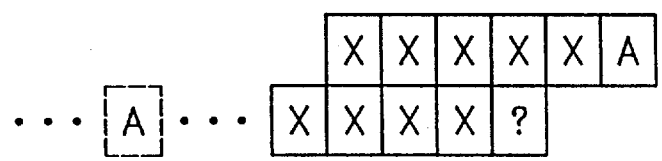
2 LINE TEMPLATE

FIG. 4

| CONTEXT ID | PMS VALUE | STATE No. |
|---|---|---|
| 00 0000 0000 | 0 | $ST_{n0}$ |
| 00 0000 0001 | 1 | $ST_{n1}$ |
| ⋮ | ⋮ | |
| $CX_i$ | $g_i$ | $ST_i$ |
| ⋮ | | |
| 11 1111 1111 | 1 | $ST_{n1023}$ |
| | (1 BIT) | (7 BITS) |

— 70

| Qe ADDRESS | Qe | PMS VALUE INVERTING FLAG | NEW STATE No. $\left(\begin{array}{c}g_i = s_i \\ g_i \neq s_i\end{array}\right)$ |
|---|---|---|---|
| 0 | Qe(0) | 0 | $NSTA_0 / NSTB_0$ |
| 1 | Qe(1) | 1 | $NSTA_1 / NSTB_1$ |
| 2 | Qe(2) | 1 | $NSTA_2 / NSTB_2$ |
| ⋮ | ⋮ | ⋮ | ⋮ |
| $ST_i$ | $Qe(ST_i)$ | | $NSTA_i / NSTB_i$ |
| ⋮ | ⋮ | ⋮ | ⋮ |
| $ST_{112}$ | $Qe(ST_{112})$ | 0 | $NSTA_{112} / NSTB_{112}$ |

90

IMAGE CODING METHOD AND SYSTEM FOR PROVIDING REDUCED BIT RATE ARITHMETIC CODES

BACKGROUND OF THE INVENTION

The present invention relates to an image coder for arithmetically coding image data and, more specifically, to an image coder for arithmetic image coding which involves compression of binary image data for an image including text letters, diagrams, dot images, etc.

There is proposed a JBIG (Joint Bi-level Image Coding Experts Group) as an international standard coding scheme for compressing bi-level still image data which is applicable to image coders. The coding scheme makes standard, as an arithmetic code-based entropy code, the QM code which has been developed on the basis of Q code and Me 1 code.

A coder according to the JBIG usually uses a symbol occurrence probability table for the sake of simplicity of arrangement. In such a coder, the coding efficiency is enhanced, that is, the bit rate of codes becomes lower as an error between a predicted symbol occurrence probability obtained from the table and an actual occurrence probability becomes smaller. In light of this fact, Japanese Patent unexamined publication No. Hei.5-183,759 discloses a coder and a decoder having a plurality of such tables for selectively using one of them according to the kind of the image constituting each page of a document in coding and decoding.

Recently, however, it is not unusual for a document page to include dot images and/or diagrams as well as text letters. Further, a single page may include photographs which have been expressed in a pseudo gradation by means of dithering, error diffusing, etc. and are accordingly different in some characteristics such as statistical properties. Also, in a single image included in a document page, areas with homogeneous dot density will have different characteristics than areas where the dot density drastically changes at a contour. Thus, there is a problem in the prior art that areas of different characteristics in a page are coded and decoded with a same symbol occurrence probability table. Therefore, all the areas of a page are not necessarily coded or decoded optimally.

SUMMARY OF THE INVENTION

It is therefore an object of the present invention to provide a method and system for providing arithmetic codes by optimally coding every pixel of a page of image which includes text letters and images.

According to an aspect of the invention, an image arithmetic coder provides reduced bit rate arithmetic codes wherein a page of image to be coded is divided into a plurality of areas, and an arithmetic coder codes each of input pixels (the pixel $S_i$) by using a predicted value of MPS (most probable symbol) and a predicted probability of LPS (least probable symbol) occurrence which are generated with a template and a LPS predicted probability table. A predetermined pixel attribute is assigned to the pixel $S_i$ by analyzing one of the areas to which said pixel $S_i$ belongs. Among a plurality of predetermined templates each optimally adapted for corresponding one of the areas, a template associated with the assigned pixel attribute is selected for the template. Among a plurality of predetermined LPS predicted probability tables each optimally adapted for corresponding one of the areas, one associated with the assigned pixel attribute is selected for the LPS predicted probability table.

The areas may be line groups into which a page of image is horizontally divided, pixel blocks into which a page of image is divided, or even a single pixel. In the last case, a predetermined pixel block is prepared for use in the determination of the pixel attribute.

In one embodiment, the predetermined pixel attributes comprise a character image attribute, a dither/dot image attribute and a halftoned image attribute. An optimized template and LPS predicted probability table are prepared for each of the attributes.

In determining the attribute of an input pixel, statistical properties are used such as a periodic property of dither/dot images, a continuous occurrence of MPS'S, etc.

Templates and predicted probability of LPS occurrence may be arranged so as to follow JBIG (Joint Bi-level Image coding expert Group) standard.

In another embodiment, a specific pixel of the template used for context data generation is moved to a position highly correlated with the input pixel to be coded, thereby reducing the bit rate of the output codes.

BRIEF DESCRIPTION OF THE DRAWINGS

The objects and features of the present invention will become more apparent from the consideration of the following detailed description taken in conjunction with the accompanying drawing in which:

FIG. 2 is a diagram showing 2-line and 3-line templates defined in the JBIG;

FIG. 4 is a diagram showing data structures of the probability predicting address RAM 70 and the QE table 90 and the relationship between the RAM 70 and the table 90;

DESCRIPTION OF THE PREFERRED EMBODIMENTS

Introduction

For the sake of better understanding of the present invention, it will be useful to describe a Markov model coder using an arithmetic coder (or a QM coder) which is a subset of the above mentioned JBIG.

In a frame or page of bi-level image, whether a pixel or a symbol takes a value of 0 or 1 is usually affected by preceding symbols to a certain extent. If the probability that a symbol $S_i$ (to be coded) takes a value of 0 or 1 is decided by the M preceding symbols $S_{i-1}, S_{i-2}, \ldots, S_{i-M}$ (reference pixels) but not affected by any further preceding symbols, that is, the conditional probability for the symbol $S_i$: $P(s_i | S_{i-1}, S_{i-2}, \ldots, S_{i-M}) = P(S_i | S_{i-1}, S_{i-2}, \ldots, S_{i-M}, S_{i-}(M+1))$, then these pixels $S_{i-1}, S_{i-2}, \ldots, S_{i-M}$ can be considered as an M-ply Markov information source, which is hereinafter referred to as a "context". Since each reference pixel is represented by a binary value, it can be thought that one ($CX_i$) of the possible $2^M$ contexts $\{CX_i|i=0, 1, 2, \ldots, 2^M-1\}$ occurs for each pixel $s_i$.

Figure 1:
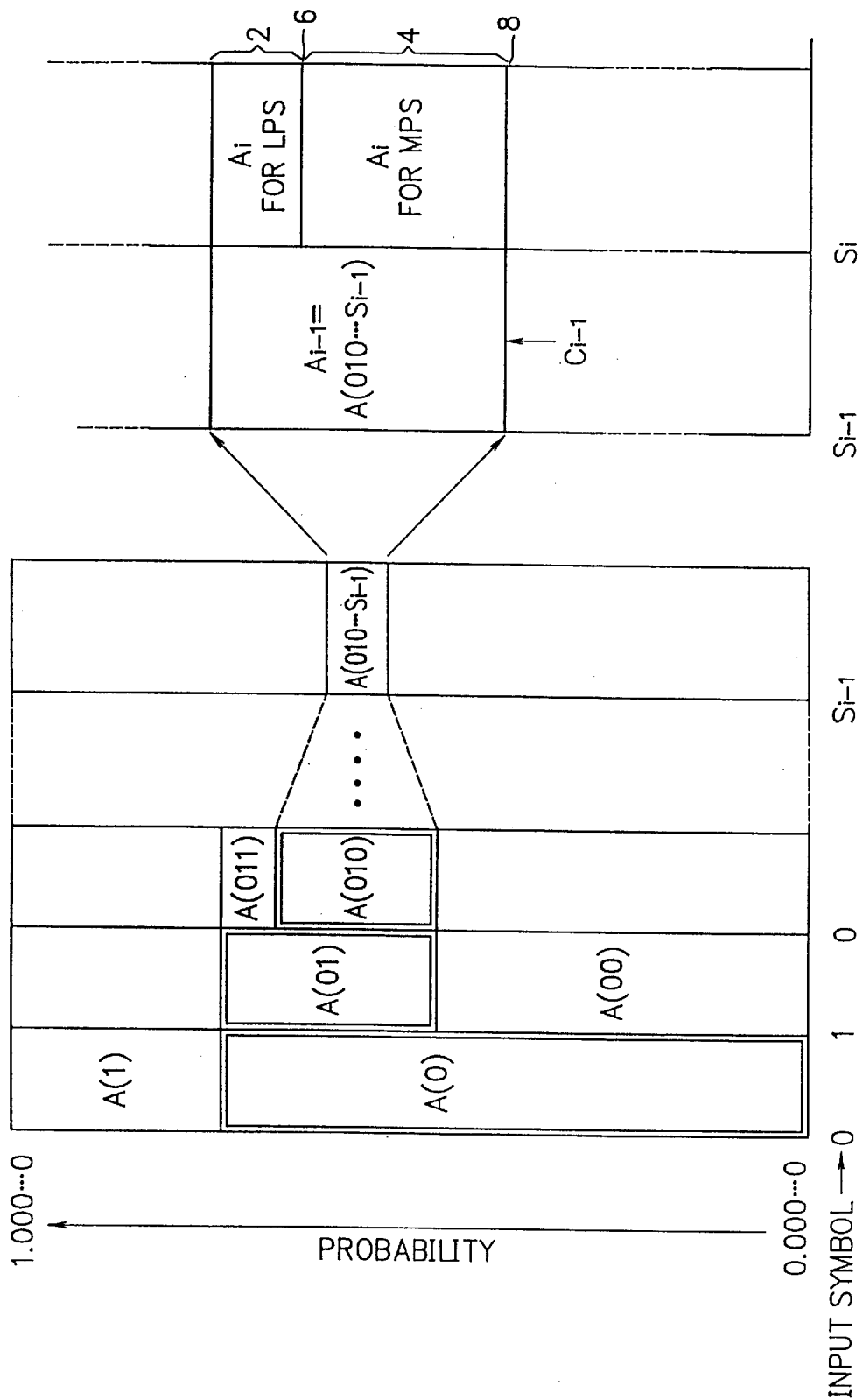
FIG. 1 is a diagram showing how the 2M contexts are mapped on the numeral line segment according to the principles of the binary arithmetic coding.

In a Markov model coding, each of the possible $2^M$ contexts is mapped on a numeral line segment extending from 0 to 1 depending on the probability of occurrence of the context. FIG. 1 is a diagram showing how the $2^M$ contexts are mapped on the numeral line segment according to the principles of the binary arithmetic coding. In FIG. 1, the vertical columns correspond to the numeral line segment. For a given context $CX_i$ a symbol which the pixel $s_i$ to be coded is more likely to take is called a most probable symbol (MPS), and a symbol which the pixel $S_i$ to be coded is less likely to take is called a least probable symbol (LPS). For the sake of the simplicity of description, it is assumed that MPS's for the symbols shown at the bottom of FIG. 1 are all 0's. The two right-hand columns are expanded expressions for the column (for $s_{i-1}$) indicative of the probability of occurrence of a symbol sequence $S_{i-1}=010 \ldots S_{i-1}$ and the following column (for a symbol $S_i$). An estimated probability for $s_i$=MPS (0 in this example) after the occurrence of symbol sequence $S_{i-1}$ is in range (or an augend) $A_i$ denoted by reference numeral 4, and represented by a code $C_i$ which is the lower limit of the augend $A_i$ and devoted by reference numeral 8. An estimated probability for $S_i$=LPS (1 in this example) after the occurrence of symbol sequence $S_{i-1}$ is in a range 2 ($A_i$ for LPS) and is especially denoted by Qe($ST_i$). Thus, the predicted probability corresponding to an LPS is disposed in the upper part of each column as compared with that for an MPS.

According to the JBIG, the above mentioned reference pixels $S_{i-1}, S_{i-2}, \ldots, S_{i-M}$ constituting a context $CX_i$ are defined as two arrangements of 10 pixels as shown in FIG. 2. These arrangements are called "templates." In each of the templates, a pixel labeled "?" is one to be coded, and a pixel labeled "A" is a special pixel which is permitted to be disposed in a appropriate position for prediction, which is known as an AT (adaptive template) function prescribed in T.82 (JBIG international standard). A Markov model coder codes each input pixel by estimating the probability of occurrence of the MPS from a context extracted from the preceding pixels with one of the templates.

Figure 3:
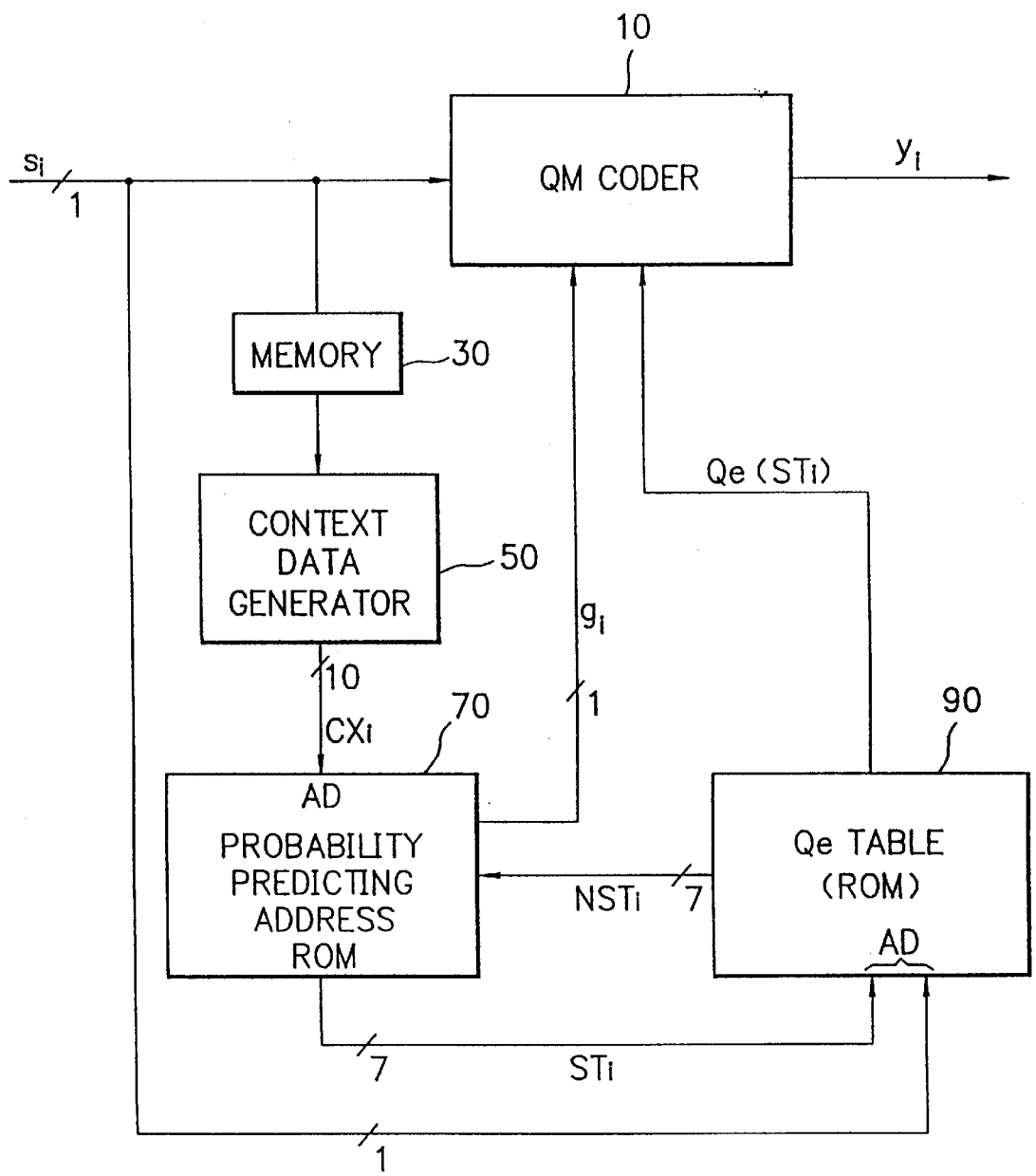
FIG. 3 is a diagram showing an exemplary Markov model coder based on a binary arithmetic coding.

FIG. 3 is a diagram showing an arrangement of an exemplary Markov model coder based on a binary arithmetic coding. In FIG. 3, the Markov model coder comprises a RAM (random access memory) 30 for storing pixels which have been input prior to the current pixel $S_i$ and necessary for generation of a context $CX_i$ for the pixel $S_i$, a context data generator 50, a probability predicting address RAM 70, a LPS occurrence probability table memory (Qe table) 90, and an arithmetic coder (QM coder) 10.

FIG. 4 is a diagram showing data structures of the probability predicting address RAM 70 and the Qe table 90 and the relationship between the RAM 70 and the table 90. Since the output of the memory 30 is applied to the address terminal of the context data generator 50, each of the possible 210 contexts is associated with a MPS value and one the states which is identified by 7 bits in the RAM 70. The associated state is applied to the address terminal of the table 90, which identifies a record of the table 90. Each of the records of the table 90 comprises an estimated probability of LPS occurrence, Qe($ST_i$) and a MPS value inverting flag in case of an occurrence of LPS. The LPS occurrence probability table 90 is shown as further comprising next state numbers NSTA$_i$ and NSTB$_i$ in cases of occurrence of MPS and LPS, respectively. However, the next state numbers NSTA$_i$ and NSTB$_i$ are actually stored in different locations from that of the Qe table 90 and accessed separately depending on the value of $S_i$ which is also applied to one of the address terminals of the Qe table 90.

Referring now to FIGS. 3 and 4, the operation of the Markov model coder will be described as follows. Input pixels are supplied to the memory 30 and the QM coder 10. In response to an input of a pixel $S_i$, the context data generator 50 reads the context data $CX_i$ from the memory 30 and supplies them to the address terminals of the probability predicting address RAM 70, which in turn outputs a single-bit predicted value $g_i$ of MPS and a 7-bit state number $ST_i$ which are in a record associated with the context data $CX_i$. The state number $ST_i$ is supplied to the Qe table 90, which in turn outputs a predicted probability of the LPS occurrence to the QM coder 10.

Assuming that $S_i=S_0S_1 \ldots S_{i-1}S_i=S_{i-1}.S_i$, the QM coder 10 operates as follows:

1. If $S_i$=LPS, then $A_i$=Qe($ST_i$)

$C_i=C_{i-1}+(A_{i-1}-Qe(ST_i))$.

2. If $s_i$=MPS, then $A_i=A_{i-1}-Qe(ST_i)$ $C_i=C_{i-1}$(as it is).

In the above equation, $A_i$ and $C_i$ denote the length and the bottom value, respectively, of the augend for LPS after the coding of symbol sequence $S_i$ and Qe($ST_i$) denotes an estimated probability of LPS occurrence for a given context $CX_i$.

If a bi-level image, such as a letter image, is coded in a JBIG system as described above, the occurrence probability of LPS begins with an initial value of 0.5 and gradually changes to 0.1 as a readout of the LPS occurrence probability table (Qe table) according to an input binary symbol and an alteration of state number in the probability predicting address RAM 70 are repeated. In an arithmetic coding, the more the estimated probability of LPS occurrence accords with the actual occurrence probability, the more the coding efficiency increases. Therefore, the Qe table 90 has to be optimally prepared in accordance with the characteristics of images to be coded.

Embodiment I

According to one aspect of the invention, an image arithmetic coder is provided capable of achieving an optimal coding of a frame or page of image including characters, dither or dot image, and/or halftoned image by error diffusion by finely changing LPS occurrence probability tables for each of the areas into which a frame of image is divided. The way of dividing an image frame may consist of any number of desired methods. For example, a frame may be divided horizontally into groups of lines or into blocks with a line of any pixels and a column of any pixels. Alternatively, instead of segmenting a frame, the LPS occurrence probability table may be changed at every pixel. A mode of changing LPS occurrence probability tables (hereinafter referred to as a "table change mode") is defined as one of line group mode, block mode and pixel mode depending on the way of dividing an image frame.

Figure 5:
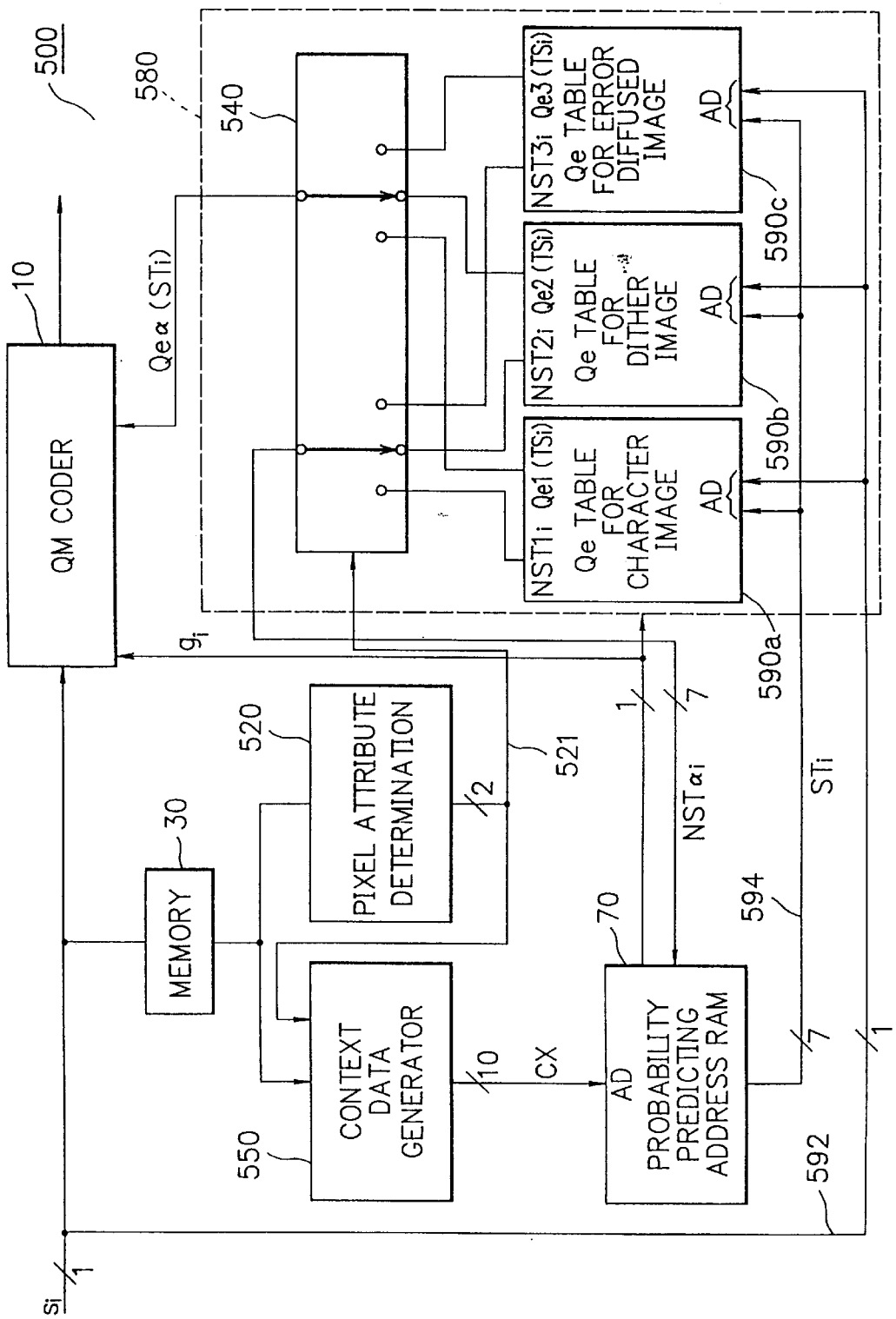
FIG. 5 is a block diagram showing an illustrative embodiment of an image arithmetic coder according to an aspect of the present invention.

FIG. 5 is a block diagram showing an illustrative embodiment of an image arithmetic coder according to an aspect of the invention. In FIG. 5, the image arithmetic coding system 500 comprises an arithmetic coder (QM coder) 10, a memory 30 and a probability predicting address RAM 70 which are identical to those of FIG. 3.

The image arithmetic coder 500 further comprises a pixel attribute determiner 520 for determining which of predetermined pixel attributes an input pixel $S_i$ has on the basis of data extracted from the memory 30 with a predetermined template to output pixel attribute data and a context data generator 550 for generating context data $CX_i$ by extracting pixel data preceding the input pixel $S_i$ with a template selected according to the pixel attribute data from the pixel attribute determiner 520. The system 500 further comprises three LPS occurrence probability tables (QM tables) 590a, 590b and 590c intended for character images, dithered or dot images, and images halftoned by error diffusion, respectively, instead of a single QM table, and accordingly a switching circuit 540 for selectively connecting one of new state numbers $NST1_i$, $NST2_i$ and $NST3_i$ and one of LPS occurrence probabilities $Qe1(ST_i)$, $Qe2(ST_i)$ and $Qe3(ST_i)$ output from the three QM tables 590a, 590b and 590c to the probability predicting address RAM 70 and the QM coder 10, respectively.

The pixel input line is connected to the QM coder 10 and the memory 30, the output of which is connected to the context data generator 550 and the pixel attribute determiner 520. The output of the pixel attribute determiner 520 is coupled with another input of the context data generator 550 and a control input terminal of the switching circuit 540. The output of the context data generator 550 is supplied to the address terminal of the probability predicting address RAM 70. The 7-bit state number output $ST_i$ and the input pixel $S_i$ are supplied to the address terminals of each of the Qe tables $590_a$, $590_b$ and $590_c$. The probability predicting address RAM 70 outputs an estimated MPS value $g_i$ to the QM coder 10.

In FIG. 5, the switching circuit 540 is a dual one-out-of-three selector with a 2-bit control input terminals common to the dual selectors. One of the dual selector of the circuit 540 has three contacts each connected to the state number terminals of the Qe table RAM's 590a through 590c, respectively and a common terminal connected to the NST $\alpha_i$ input of the probability predicting address RAM 70. The other selector of the circuit 540 has three contacts, each connected to the LPS occurrence probability output terminals of the Qe table RAM's 590a through 590c, respectively, and a common terminal connected to the Qe $\alpha$ ($ST_i$) input terminal of the QM coder 10. The 2-bit control input terminals of the circuit 540 are connected to the probability predicting address RAM 70.

Figure 6:
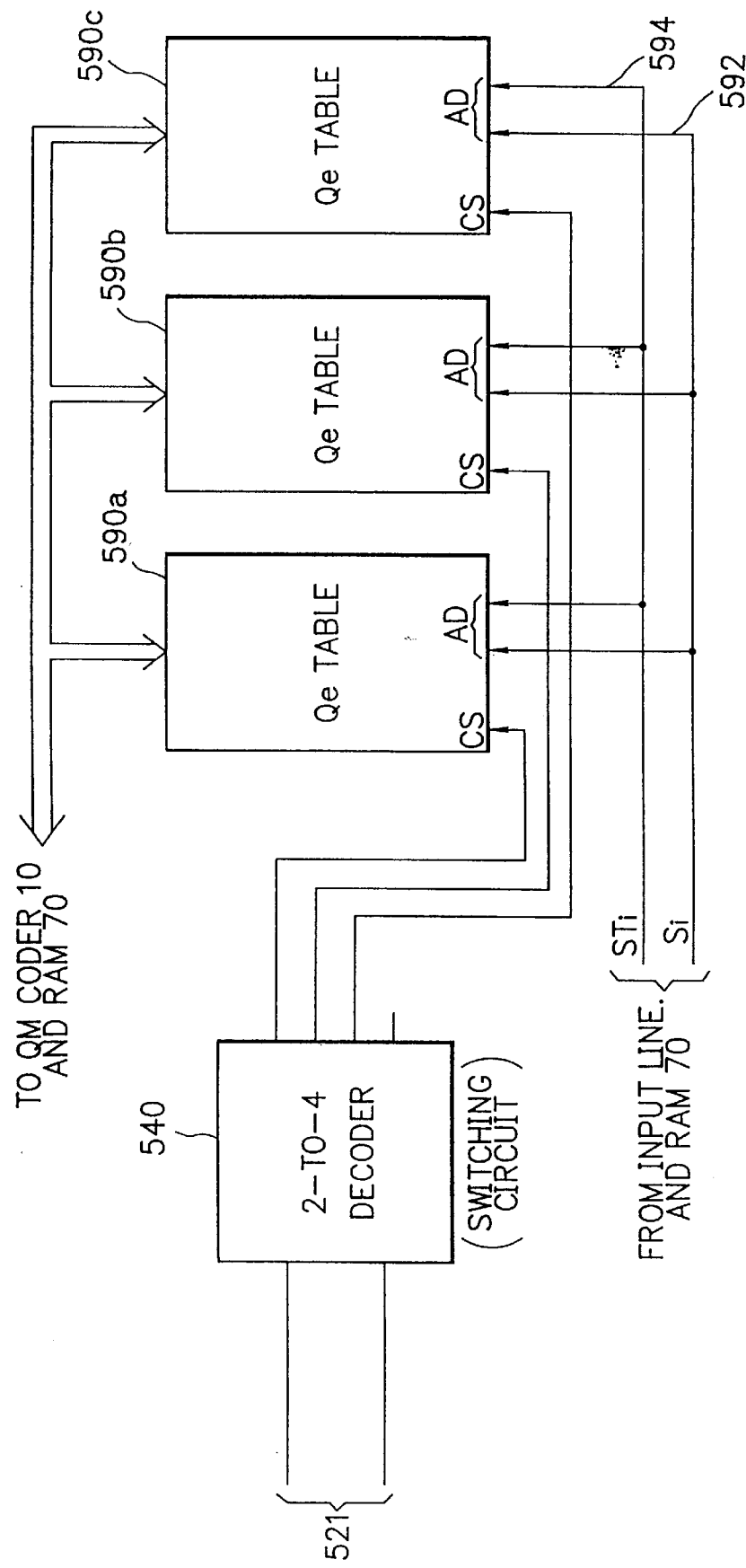
FIG. 6 is a block diagram showing an actual arrangement including the switching circuit 540 and the Qe table ROM's 590*a*, 590*b* and 590*c*.

Since FIG. 5 is drawn to conceptually show the data flow in the inventive image coder 500, the real arrangement is different from that shown in FIG. 5. For example, the switching circuit 540 is realized as shown in FIG. 6. FIG. 6 is a block diagram showing an actual arrangement including the switching circuit 540 and the Qe table ROM's 590a, 590b and 590c. That is, the element 540 comprises a 2-to-4 decoder having two input terminals thereof connected to the pixel attribute determiner 520 output and three of the four decoded outputs thereof connected to a chip select terminal CS of each of the Qe table ROM's 390a through 390c which are advantageously comprised of different ROM chips. Actually, instead of using dedicated output lines, the data terminals of the Qe table ROM's are connected with the data bus which is also connected to the QM decoder 10 and the RAM 70 as is conventionally practiced in similar fields.

The 2-to-4 decoder 540 and the Qe table ROM's 590a, 590b and 590c are among the constituent elements of an LPS probability predictor 580.

Figure 7:
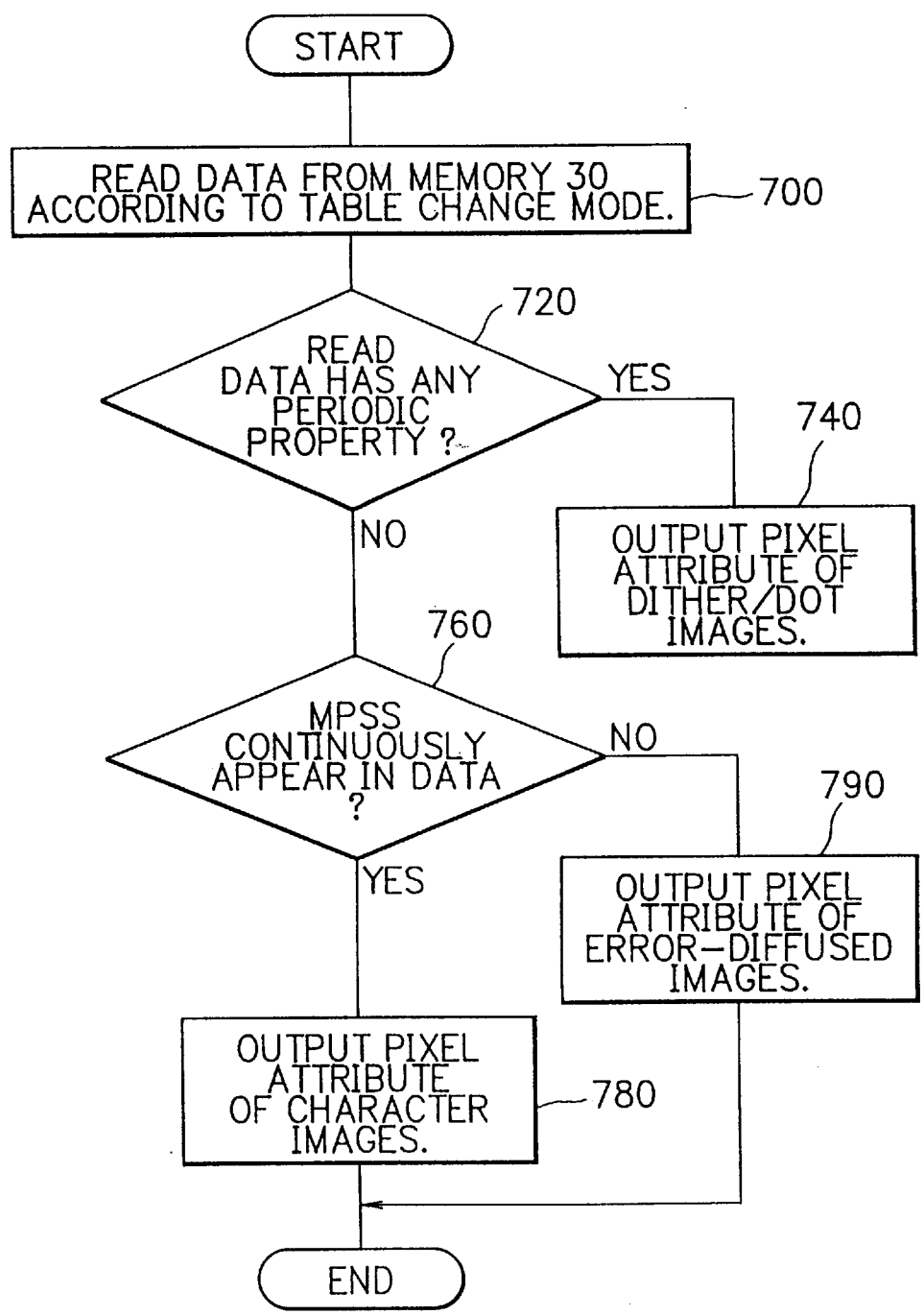
FIG. 7 is a flow chart showing operation of the pixel attribute determiner 520 of FIG. 5.

In operation, input pixels are supplied to the QM coder 10 and the memory 30, which stores pixel data input prior to the input pixel $S_i$. A pixel attribute determiner 520 determines which pixel attribute of the three categories—character image, dither/dot image, and error-diffused image—, the input pixel $S_i$ has on the basis of data extracted from the memory 30 according to the above mentioned table change mode. FIG. 7 is a flow chart showing operation executed by the pixel attribute determiner 520.

In FIG. 7, in response to a reception of pixel $S_i$, the determiner 520 reads data from the memory 30 for use in a determination of the pixel attribute of the received pixel $S_i$. In the line group mode or the block mode, data of a line group or a block defined in the mode is read from the memory 30 in step 700. In the case of the pixel mode, data defined by a predetermined template is read. A test is made on the read data to see if the data has any periodic property in step 720. If so, then the determiner 520 outputs pixel attribute data indicative of dither/dot images in step 740 and, otherwise, proceeds to step 760 to make another test on the read data by, for example, calculating run lengths to see if MPS continuity is found in the data. If so, the determiner 520 outputs pixel attribute data indicative of character images in step 780, and otherwise outputs pixel attribute data indicative of error-diffused images in step 790. The operation of the pixel attribute determiner 520 is based on well-known statistical properties of the image as follows:

The occurrence probability of a least probable symbol (the LPS occurrence probability) changes depending on the kind of image. For example, the LPS occurrence probability is as small as say 0.1 in bi-level images such as character images. On the other hand, images obtained by halftoning of photographs have a LPS occurrence probability of 0.4, which is as high as LPS'S.

Figure 8:
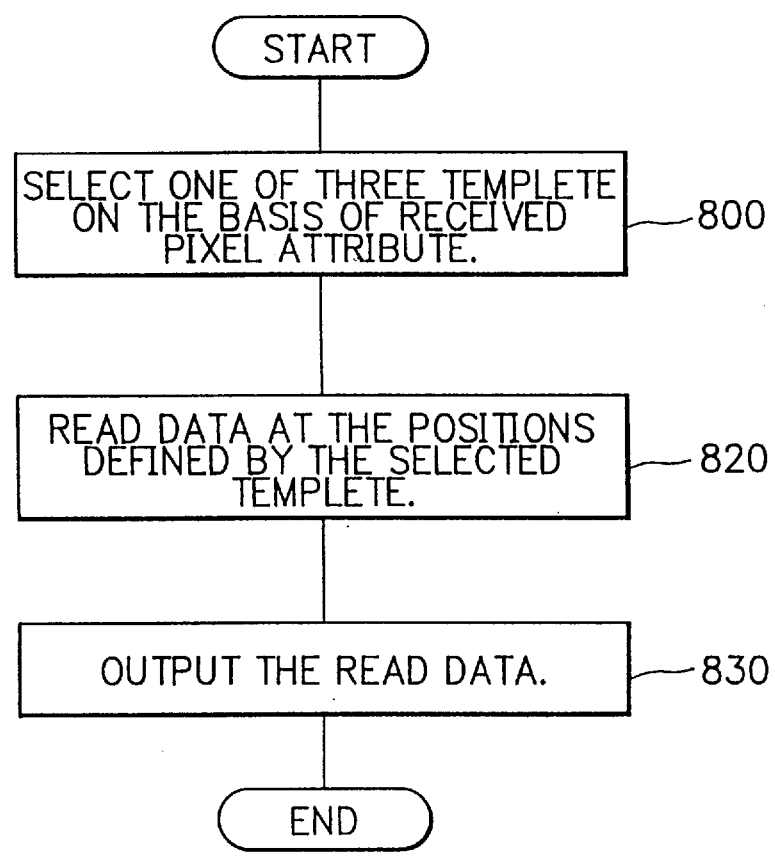
FIG. 8 is a flow chart showing operation of the context data generator 550 of FIG. 5.

FIG. 8 is a flow chart showing operation in accordance with the present invention, of the context data generator 550. On receiving the pixel data $S_i$, the context data generator 550 selects one of the three predetermined templates which is associated with the pixel attribute specified by the pixel attribute data from the pixel attribute determiner 520 at step 800. Each of the predetermined templates comprises pixels of 10 which is the same number as that defined in JBIG, and has a different pixel arrangement optimally adapted for statistical properties of images of the pixel attribute. The context data generator 550 reads, in step 820, data from the memory 30 using the selected template, and, in step 830, latches the read data as a context $CX_i$ data in a latch (not shown) connected to the address bus so that the context $CX_i$ data can be used to access a record of the probability predicting address RAM 70 which is associated with the context $CX_i$ as shown in the upper part of FIG. 4.

Referring now to FIGS. 4 through 6, we discuss how the three Qe tables 590a through 590c are accessed as follows. The probability predicting address RAM 70 outputs a single-bit predicted value $g_i$ of MPS and a 7-bit state number $ST_i$ which are in a record identified by the context data $CX_i$. The state number $ST_i$ and the input pixel data $S_i$ are supplied to the address terminals of each of the three Qe tables 590a through 590c. At the same time, the pixel attribute data output from the pixel attribute generator 520 is decoded by the decoder 540 to cause one of the three output lines of the decoder 540 associated with the determined pixel attribute from the element 520 to become logical one, which in turn selects a Qe table 590d (associated with the determined pixel attribute among the Qe tables 590a through 590c as shown in FIG. 6, where d is a parameter for indicating one of the letters "a", "b" and "c". In this way, the selected Qe table 590α outputs a predicted probability of LPS occurrence for Pixel $S_i$, Qea ($TS_i$) identified by the state number $ST_i$. The predicted probability of LPS occurrence Qe α ($ST_i$) is used together with the predicted value of PMS, $g_i$, in arithmetic coding of QM coder 10. The selected Qe table 590 α further outputs to the probability predicting address RAM 70 a new state number $NSTA_i$ or $NSTB_i$ used in updating the state number in the record which has caused this output operation. If the predicted value of PMS, $g_i$, coincides with the actual pixel value $S_i$, the new state number $NSTA_i$ is output. If $g_i \# S_i$, then the new state number $NSTB_i$ is output.

Thus, the QM coder 10, thereafter, can code each of the input pixels, $S_i$, by using a predicted MPS value $g_i$ and a predicted probability of LPS, Qe α ($ST_i$), occurrence generated with an optimal template and an optimal Qe table 590 α for line group to which the pixel $S_i$ belongs, a box on which the pixel $S_i$ belongs, or the pixel $S_i$.

Embodiment II

Figure 9:
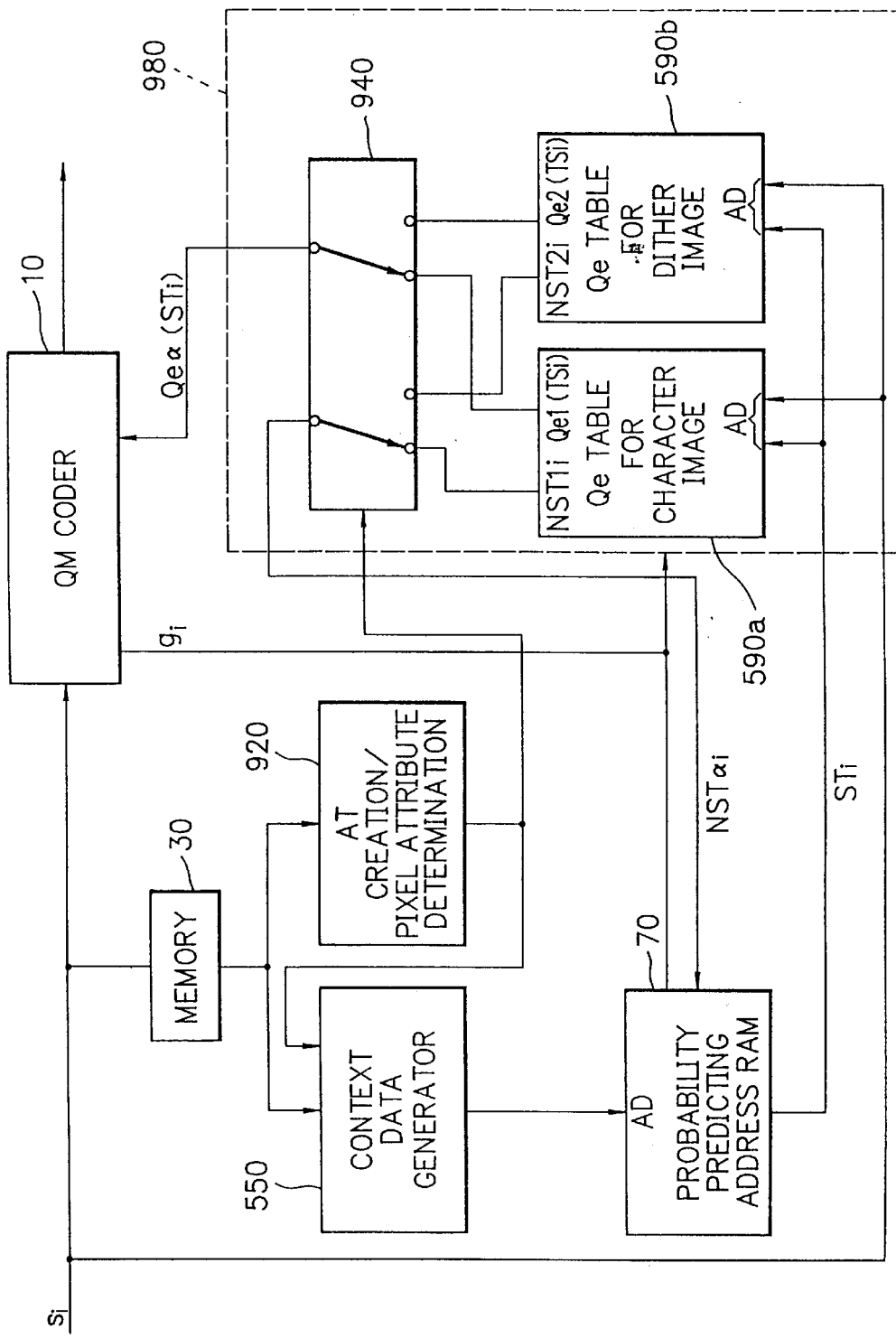
FIG. 9 is a block diagram showing a second illustrative embodiment of an image arithmetic coder according to another aspect of the present invention.

FIG. 9 is a block diagram showing a second illustrative embodiment of an image arithmetic coder according to another aspect of the present invention. The image arithmetic coder of FIG. 9 is identical to that of FIG. 5 except that the pixel attribute determiner 520 has been replaced with an AT creation/pixel attribute determination 920, and the Qe table 590c has been eliminated and accordingly the dual one-out-of-three selector 540 with a 2-bit control input terminals has been replaced with a dual one-out-of-two selector 940 with a single-bit control input terminal. Only features different from those of the first illustrative embodiment will be described in the following.

In this embodiment, each page of image is divided into a plurality of line groups. An AT creation/pixel attribute determination 920 first determines the position of the template pixel "A" according to the adaptive template prescribed in T.82(JBIG international standard). Analyzing the statistical properties of the line group to which the pixel $S_i$ belongs, the AT creation/pixel attribute determination 920 places the template pixel "A" at such a position as highly correlated with the pixel $S_i$. For example, if the element 920 has found that the line group has a periodic property with a period of 5 pixels in the horizontal direction, than the pixel "A" is placed at the pixel position 5 pixels before the pixel $S_i$. Also, the AT creation/pixel attribute determination 920 determines the pixel attribute of the line group in the same manner as in the first embodiment. Thus, an optimal template is determined for each line group.

If the line group to which the pixel $S_i$ belongs has a dither image attribute, then the element 920 passes the A-pixel position information as well as the pixel attribute data to the context data generator 950. The context data generator 950 generates context $CX_i$ data using the A-pixel position information. Thus, using an optimal template and a suitable Qe table for each line group results in an enhancement of the coding efficiency.

What is claimed is:

1. A bi-level image coding method for providing reduced bit rate arithmetic codes wherein a page of image to be coded is divided into a plurality of areas, and an arithmetic coder codes each of input pixels (the pixel $S_i$) by using a predicted value of MPS (most probable symbol) and a predicted probability of LPS (least probable symbol) occurrence which are generated with a template and a LPS predicted probability table, the method comprising the steps of:

assigning one of predetermined pixel attributes to said pixel $S_i$ by analyzing one of the areas to which said pixel $S_i$ belongs;

among a plurality of predetermined templates each optimally adapted for corresponding one of said areas, selecting one associated with said assigned pixel attribute for said template; and among a plurality of predetermined LPS predicted probability tables each optimally adapted for corresponding one of said areas, selecting one associated with said assigned pixel attribute for said LPS predicted probability table.

2. The method as defined in claim 1, further comprising the step of:

dividing said page of image to be coded into a plurality of line groups in order to obtain said plurality of areas.

3. The method as defined in claim 1, further comprising the step of:

dividing said page of image to be coded into a plurality of blocks defined by a first arbitrary number of lines and a second arbitrary number of columns in order to obtain said plurality of areas.

4. The method as defined in claim 1, further comprising the step of determining that each of said plurality of areas is a pixel, wherein said assigning step comprises the step of assigning one of said predetermined pixel attributes to said pixel $S_i$ by analyzing a predetermined pixel block containing said pixel $S_i$.

5. The method as defined in claim 1, further comprising the steps of:

selecting a character image attribute, a dither/dot image attribute and a halftoned image attribute for said predetermined pixel attributes;

preparing templates each optimally adapted for said character image attribute, said dither/dot image attribute and said halftoned image attribute as said plurality of predetermined templates; and preparing LPS predicted probability tables each optimally adapted for said character image attribute, said dither/dot image attribute and said halftoned image attribute as said plurality of predetermined LPS predicted probability tables.

6. The method as defined in claim 5, wherein said assigning step comprises the step of:

assigning said dither/dot image attribute to said pixel $S_i$ in the event said one of the areas to which said pixel $S_i$ belongs has any periodic property.

7. The method as defined in claim 5, wherein said assigning step comprises the step of:

assigning said character image attribute to said pixel $S_i$ in the event said one of the areas to which said pixel $S_i$ belongs has an MPS sequence longer than a predetermined length.

8. The method as defined in claim 1, further comprising the steps of:

selecting templates as defined in JBIG (Joint Bi-level Image coding expert Group) standard for said predetermined templates; and adapting said predicted probability of LPS (least probable symbol) occurrence to the QM code as defined in said JBIG standard.

9. The method as defined in claim 8, further comprising the step of:

moving a specific pixel of said template to a position highly correlated with said pixel $S_i$ according to the AT (adaptive template) function defined in T.82(JBIG) standard.

10. A bi-level image coding system for providing reduced bit rate arithmetic codes wherein a page of image to be coded is divided into a plurality of areas, the system comprising:

an arithmetic coder for coding each of input pixels (the pixel $S_i$) by using a predicted value of MPS (most probable symbol) and a predicted probability of LPS (least probable symbol) occurrence;

a plurality of LPS predicted probability tables for storing at least said predicted probability of LPS occurrence in a record identified by a state number associated with said pixel $S_i$, each table being optimally adapted for corresponding one of said areas, one associated with said assigned pixel attribute for said LPS predicted probability table;

means for assigning one of predetermined pixel attributes to said pixel $S_i$ by analyzing one of the areas to which said pixel $S_i$ belongs;

means for selecting among a plurality of predetermined templates each optimally adapted for corresponding one of said areas, one associated with said assigned pixel attribute;

means for storing at least said predicted value of MPS and said state number in a record identified by context data generated from pixel data before the pixel $S_i$ by using said selected template; and means for selecting, among said plurality of LPS predicted probability tables, one associated with said assigned pixel attribute.

11. The system as defined in claim 10, wherein:

said plurality of areas comprises a plurality of line groups into which a page of image is horizontally divided.

12. The system as defined in claim 10, wherein:

said plurality of areas comprises a plurality of blocks defined by a first arbitrary number of lines and a second arbitrary number of columns in order to obtain said plurality of areas.

13. The system as defined in claim 10, wherein each of said plurality of areas is a pixel, and wherein said assigning means comprises:

means assigning one of said predetermined pixel attributes to said pixel si by analyzing a predetermined pixel block containing said pixel $S_i$.

14. The system as defined in claim 10, wherein:

said predetermined pixel attribute comprises a character image attribute, a dither/dot image attribute and a halftoned image attribute; said plurality of predetermined templates comprising three templates each optimally adapted for said character image attribute, said dither/dot image attribute and said halftoned image attribute; and said plurality of LPS predicted probability tables comprising three LPS predicted probability tables each optimally adapted for said character image attribute, said dither/dot image attribute and said halftoned image attribute.

15. The system as defined in claim 14, wherein said assigning means comprises:

means for assigning said dither/dot image attribute to said pixel $S_i$ in the event said one of the areas to which said pixel $S_i$ belongs has any periodic property.

16. The system as defined in claim 14, wherein said assigning means comprises:

means for assigning said character image attribute to said pixel $S_i$ in the event said one of the areas to which said pixel $S_i$ belongs has an MPS sequence longer than a predetermined length.

17. The system as defined in claim 10, wherein:

said predetermined templates and said predicted probability of LPS occurrence follow the JBIG (Joint Bi-level Image coding expert Group) standard; and said reduced bit rate arithmetic codes are QM codes as defined in said JBIG standard.

18. The system as defined in claim 17, further comprising:

means for moving a specific pixel of said template to a position highly correlated with said pixel $S_i$ according to the AT (adaptive template) function defined in T.82 (JBIG) standard.

* * * * *